US005452037A

United States Patent [19]

Blackman

[11] Patent Number: 5,452,037
[45] Date of Patent: Sep. 19, 1995

[54] FILM CARTRIDGE MAGAZINE

[75] Inventor: Robert J. Blackman, Rochester, N.Y.

[73] Assignee: Eastman Kodak Company, Rochester, N.Y.

[21] Appl. No.: 242,472

[22] Filed: May 12, 1994

[51] Int. Cl.[6] ..................... G03B 17/26; G03D 13/06; G03D 3/08

[52] U.S. Cl. .................................... 354/275; 354/310; 354/319; 198/502.1

[58] Field of Search ................................ 354/319–323, 354/340, 275, 345, 174, 75; 355/123; 221/69–71, 74, 106, 105, 122, 81; 353/116, 113, 26; 242/332.4, 594.3, 595.1, 595; 206/389; 352/78 R, 123, 125

[56] References Cited

U.S. PATENT DOCUMENTS

| | | | |
|---|---|---|---|
| 3,195,438 | 7/1965 | Woodcock | 354/321 |
| 3,753,486 | 8/1973 | Vogt et al. | 198/502.1 |
| 3,776,483 | 12/1973 | Reitter | 242/595.1 |
| 3,903,535 | 9/1975 | Moodie et al. | 354/174 |
| 4,731,628 | 3/1988 | Uenaka et al. | 354/319 |
| 4,797,698 | 1/1989 | Uenaka et al. | 354/319 |
| 4,817,023 | 3/1989 | Yamaguchi et al. | 364/525 |
| 4,831,401 | 5/1989 | Uchiyama et al. | 354/319 |
| 4,843,412 | 6/1989 | Uchiyama et al. | 354/319 X |
| 5,031,852 | 7/1991 | Dowling et al. | 242/348.3 |
| 5,032,707 | 7/1991 | Gudmundson et al. | 355/40 X |
| 5,109,242 | 4/1992 | Massarsky | 354/174 |
| 5,229,802 | 7/1993 | Shiota et al. | 354/340 |
| 5,231,439 | 7/1993 | Takahashi et al. | 354/320 X |
| 5,325,144 | 6/1994 | Yoshikawa et al. | 354/319 |
| 5,347,338 | 9/1994 | Weibel | 354/340 |

*Primary Examiner*—D. Rutledge
*Attorney, Agent, or Firm*—Frank Pincelli

[57] ABSTRACT

A magazine for holding plurality of film cartridges and method handling thrust film cartridges in a photofinishing process using the magazine. The magazine comprises a plurality of retaining pockets, each pocket designed to hold a film thrust cartridge. Each thrust cartridge having a rotatably mounted spool therein for holding a filmstrip wound around the spool. The magazine includes a flexible retaining member associated with each of the pockets for allowing insertion or removal of the thrust cartridge from the pocket and for retaining the thrust cartridge in a predetermined position when the thrust cartridge is disposed in the pocket. The support member has a first access opening for allowing placement of the cartridge into the pocket and for allowing access to the spool of the thrust cartridge such that the spool can be rotated thrusting the filmstrip out of the cartridge or rewound back into the cartridge and a second access opening associated with each of the pockets for allowing the filmstrip to be removed from the thrust cartridge or returned to the thrust cartridge while the cartridge is in the pocket.

27 Claims, 5 Drawing Sheets

FILM CARTRIDGE MAGAZINE

CROSS-REFERENCE TO RELATED APPLICATIONS

Reference is made to commonly assigned copending U.S. patent application Ser. No. 08/241,877, entitled PHOTOFINISHING METHOD AND APPARATUS, and filed on even date herewith in the names of Jack DeMarti and Walter C. Slater, which is hereby incorporated by reference into the present application.

1. Field of the Invention

The invention relates to magazines for use in photography to contain and facilitate the handling of a plurality of film cartridges.

2. Description of the Prior Art

In a typical photofinishing operation, film rolls are accumulated, sorted, and removed from their containing cartridges for processing. The cartridges are cracked open to release the film, and discarded at a very early stage in the operation. During their short life the cartridges are handled in bins, totes, and conveyors for isolating batches of film according to the required processing parameters. Although the film cartridge often does not last long in the processing facility, cartridge magazines have been employed to facilitate their handling. Gudnumdson et al, U.S. Pat. No. 5,032,707, issued Jul. 16, 1991, discloses one example that includes a film magazine for maintaining sorted film in transportable batches. The magazines comprising a rectangular tube open at one end with a slot along one side.

Photographic processes have been proposed in which the film was retained in its cartridge throughout the processing operation, or is returned to a similar cartridge after film processing. The cartridges are typically handled by conveyors, or, again, in rectangular tubes. One approach is presented in Takahashi et al, U.S. Pat. No. 5,231,439, issued Jul. 27, 1993. Takahashi et al uses rectangular tubes including an escape mechanism for detaining and dispensing the film cartridges.

Of course photographic slides have been handled in carousel magazines for many years. A similar approach is presented in Yamaguchi et al, U.S. Pat. No. 4,817,023, issued Mar. 28, 1989. Yamaguchi et al discloses a cylindrical magazine for handling photographic slides in a printing operation.

Prior art proposals have not adequately addressed requirements for handling film and film cartridges for the entire photographic processing process. Typically the cartridges are required to be manipulated at various stations. Additionally, the prior art has been limited to single operations.

The present invention has many different applications, and the problems solved differ depending on the application. In general, the prior art approaches lack of flexibility of providing the single magazine which can be used throughout the entire photofinishing process and allow a continued processing in the photofinishing process. Additionally, the magazines allow thrusting of the filmstrip while the cartridge is in the magazine. In addition, the magazine is designed so that identification and other information placed on the cartridge can be read visually or by machine without requiring their removal from the magazine.

SUMMARY OF THE INVENTION

In one aspect of the invention there is provided a magazine for holding plurality of film cartridges. The magazine comprises a plurality of retaining pockets, each pocket designed to hold a film thrust cartridge. Each thrust cartridge having a rotatably mounted spool therein for holding a filmstrip wound around the spool. The magazine includes a flexible retaining member associated with each of the pockets for allowing insertion or removal of the thrust cartridge from the pocket and for retaining the thrust cartridge in a predetermined position when the thrust cartridge is disposed in the pocket. The support member has a first access opening for allowing placement of the cartridge into the pocket and for allowing access to the spool of the thrust cartridge such that the spool can be rotated for thrusting the filmstrip out of the cartridge or rewound back into the cartridge and a second access opening associated with each of the pockets for allowing the filmstrip to be removed from the thrust cartridge or returned to the thrust cartridge while the cartridge is in the pocket.

In another aspect of the present invention there is provided a method of handling a thrust film cartridge comprising steps of:

providing a film magazine having a plurality of retaining pockets provided in the magazine, each pocket designed to hold a film thrust cartridge, each thrust cartridge having a rotatably spool mounted therein for holding a filmstrip wound around the spool, the magazine having a flexible retaining member associated with each of the pockets for allowing insertion or removal of the thrust cartridge from the pocket and for retaining the thrust cartridge in a predetermined position when the thrust cartridge is disposed in the pocket, the support member having a first access opening for allowing placement of the cartridge into the pocket and for allowing access to the spool of the thrust cartridge such that the spool can be rotated thrusting the filmstrip out of the cartridge or rewound back into the cartridge and a second access opening associated with each of the pockets for allowing the filmstrip to be removed from the thrust cartridge or returned to the thrust cartridge while the cartridge is in the pocket;

transporting the film cartridges disposed in the magazine through a plurality of workstations;

thrusting of the filmstrip from the cartridge to a workstation and returning the filmstrip to the thrust cartridge while the thrust cartridge is being held in the magazine; and transporting the cartridges while in the magazines to a subsequent workstation.

These and other features and advantages of the invention will be more clearly understood and appreciated from a review of the following detailed description of the preferred embodiment and appended claims, and by reference to the accompanying drawings.

DETAILED DESCRIPTION OF THE INVENTION

Figure 1:
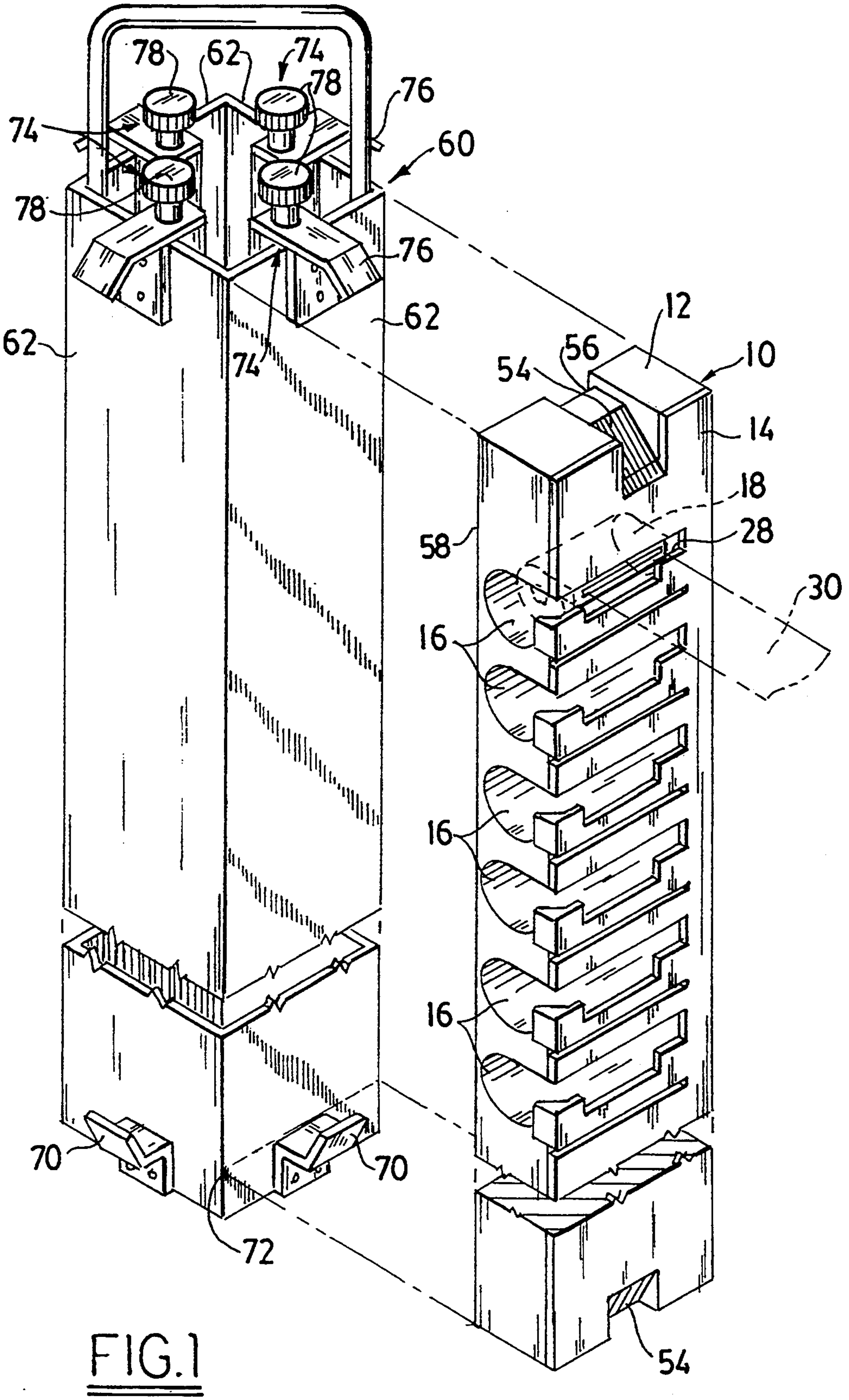
FIG. 1 is an exploded perspective view of a film cartridge magazine and carrier made in accordance with the present invention.
Figure 2:
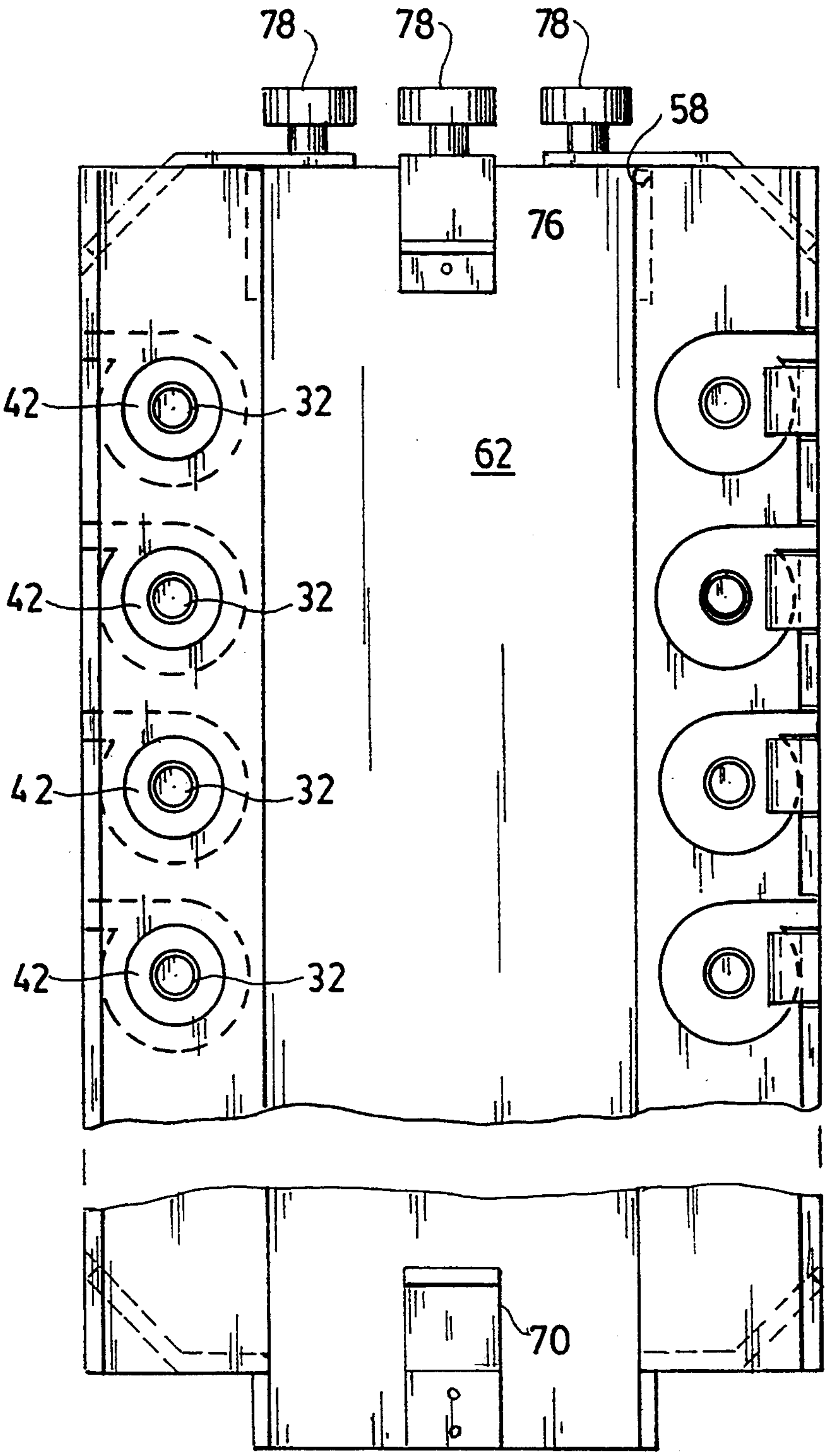
FIG. 2 is a front elevational view of the carrier of FIG. 1 with two magazines mounted thereto, one on either side.
Figure 5:
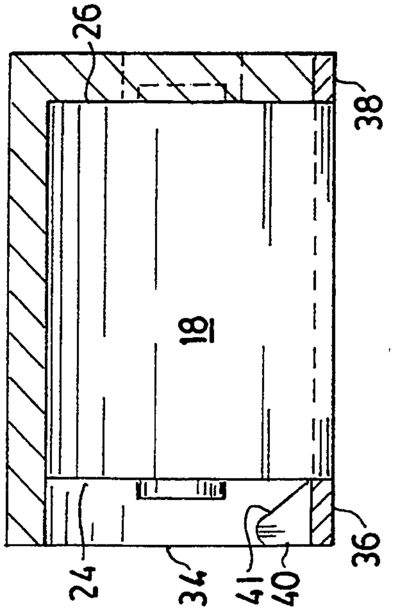
FIG. 5 is a cross-sectional view of the magazine of FIG. 4 as taken along line 5—5.
Figure 6:
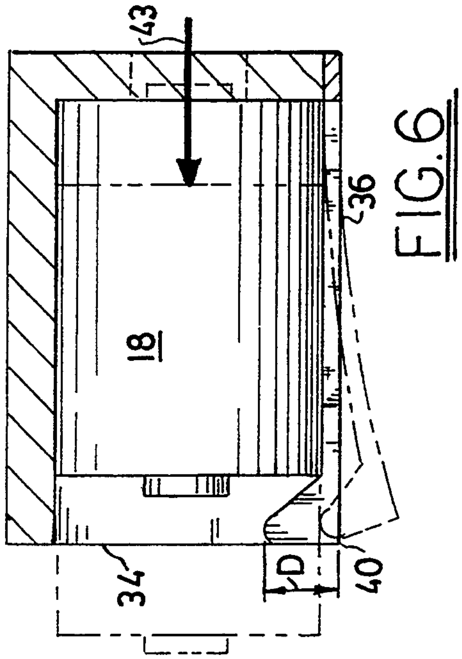
FIG. 6 is a cross-sectional view of the magazine of FIG. 4 as taken along line 6—6.

Referring to FIGS. 1-6, there is illustrated a magazine 10 made in accordance with the present invention. The magazine 10 includes a substantially rectangular support member 12 and associated cover member 14. The support member 12 and cover member 14 combine so as to define a plurality of vertically aligned retaining pockets 16. Each pocket 16 is designed to hold a film thrust cartridge 18 as best seen in FIGS. 3-6. The thrust film cartridge 18 includes a generally cylindrical body 20 and snout 22. The body 20 is bounded by substantially straight side walls 24,26. The snout defines an opening 28 through which a filmstrip may be passed either into or out of the thrust film cartridge 18. A rotatable spool 32 is mounted within the body 20 around which a strip of photographic film may be wound. In use, the filmstrip 30 is extended from and retracted back into the body 18 through the opening 28, typically this type cartridge is referred to as a thrust cartridge. In some applications the filmstrip 30 may be removed completely from the cartridge 18 and in other applications the filmstrip may remain attached to the spool 32. A more detailed description of a suitable thrust cartridge may be found in U.S. Pat. Nos. 5,031,852 and 5,200,777, which are incorporated by reference in their entirety. Each of the pockets 16 have an inner configuration which conforms substantially to the outer configuration of the cartridge 18 such that the cartridge 18 when placed in the pocket 16 will be held in a predetermined position.

The magazine 10 is provided with a supply opening 34 which allows the thrust film cartridge 18 to either be inserted or removed from the pocket 16. The thrust film cartridge 18 is held in position in the pocket 16 by a flexible retaining member 36 associated with each pocket 16. The flexible retaining member 36, in the preferred embodiment, illustrated is integrally formed as a part of cover member 14. The flexible retaining member 36 extends from one end 38 of the cover member 14 along the length of the cartridge 18 and pocket 16 terminating in a retaining end member 40 having an engaging surface 41 which is designed to be placed adjacent side 24 of the film thrust cartridge 18. The flexible retaining member 36 is designed such that it can be flexed (see phantom lines in FIG. 6) in a direction so that the thrust film cartridge 18 may be easily inserted or removed from the pocket 16 as later described herein. The flexible retaining member 36 will move a distance D for allowing access to the pocket by the film thrust cartridge 18. In the embodiment illustrated, distance D is about 0.25 inches (0.635 cms) and the retaining member 36 is made of a material and sized so as to provide the appropriate flexibility. In the particular embodiment illustrated, the cover member 14, including retaining member 36, is made out of plastic material, i.e. polycarbonate. Thus, the cover member 14 and integral retaining member 36 can be molded in order to provide low cost and easy manufacture. In a similar manner, support member 12 is also preferably molded of a plastic material, such as polycarbonate. The cover member 14 and support member 12 are appropriately secured together by any desired fastening means, for example, by adhesive or by screws which pass through openings in the cover member 14 into threaded openings in the support member 12. It is to be understood that the support member and cover member may be made of any desired material and the parts may be fabricated and secured in any appropriate manner.

The support member 12 and cover member 14 are also configured so as to provide an access opening 42 on the side opposite opening 34 for allowing access to the spool 32 of the thrust cartridge or side 26. The size of access opening 42 is preferably designed such that the thrust cartridge 18 may be pushed out of the pocket 16 by a simple axial thrusting member, not shown in the direction shown by arrow 43. Additionally, the access opening 42 and supply opening 34 are designed such that an appropriate drive mechanism can engage the spool 32 for rotating of the spool 32 in the desired direction for either thrusting the filmstrip 30 out of the thrust cartridge 18 or for rewinding of the filmstrip 30 back into the thrust cartridge 18 as is discussed later in detail later herein.

The cover member 14 and support member 12 are shaped and configured such that a slot opening 44 is formed for holding and retaining snout 22 of the film cartridge 18

Figure 4:
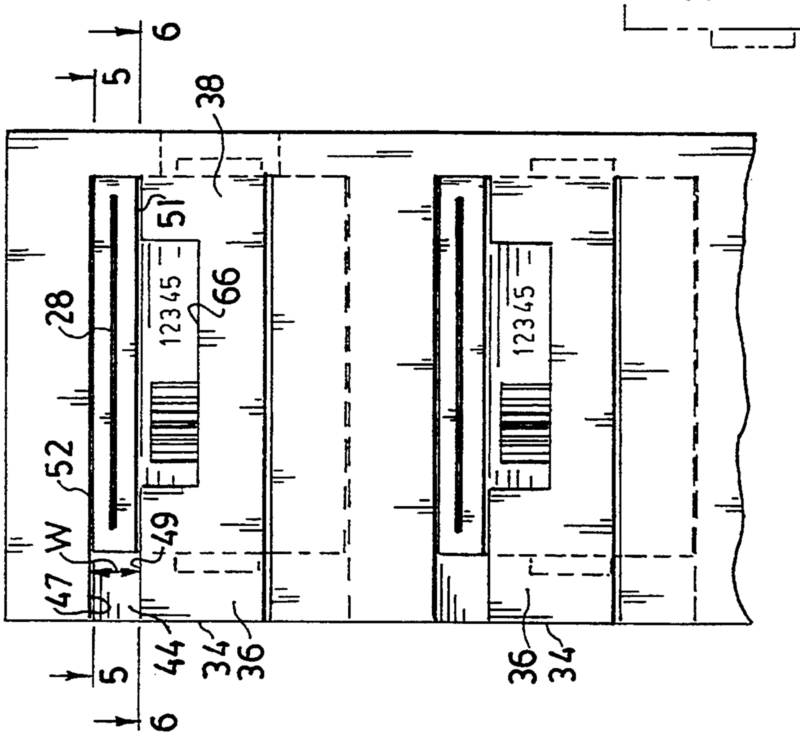
FIG. 4 is a front elevational view of the partial magazine of FIG. 3 as taken along line 4—4.
Figure 3:
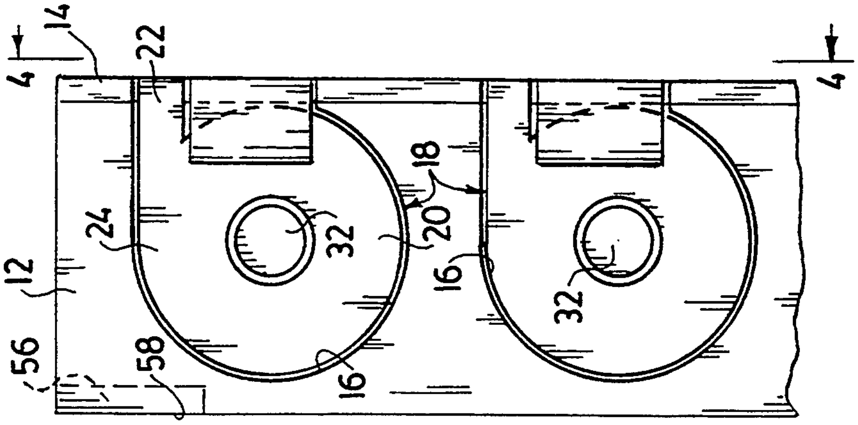
FIG. 3 is an enlarged partial side elevational view of the magazine of FIG. 1 containing two thrust film cartridges.

In particular, opening 44 has a width W so that the surfaces 47,49 of cover member 14 will be closely adjacent the snout 22. When the cartridge 18 has been placed in pocket 16, the thrust cartridge 18 will be positioned in a predetermined orientation. Preferably, the pockets 16 are designed such that all the pockets 16 are positioned substantially in the same orientation so that the filmstrips 30 disposed therein will each be thrust out at a particular direction and oriented with respect to the magazine 10. The retaining member 36 is also provided with a cutout section 66 adjacent the opening 44 so that indicia that is present on the thrust cartridge can be read, for example, FID machine readable barcode. Alternatively, if desired additional visual information may be placed on the cartridge for visual or reading. Thus, as illustrated in FIG. 4, surfaces 49 is adjacent the bottom surface 51 of the snout 22 while the surface is juxtaposed to the top surface 52 of the snout 22.

The magazine 10 is configured so that it may be adapted to a carrier for holding a plurality of magazines or for maintaining the magazine or other mechanisms associated with photofinishing equipment. In the particular embodiment illustrated, FIG. 1 provides a pair of cutout sections 54 at the top and bottom portions of the magazine 10 and a generally vertically extending slot 56 on the back surface 58 on the back surface 58 of the magazine. The slot 56 is designed for locating of the magazine in a predetermined position with respect to a mechanism or carrier.

Referring to FIG. 1, there is illustrated a carrier 60 designed to hold four magazines 10 on its four sides 62. In the particular embodiment illustrated, the carrier 60 is in the shape of a generally elongated tube having a generally substantially square cross-sectional configuration. The carrier 60 has means for securely holding a magazine 10 on each of its sides 62. In the particular embodiment illustrated the carrier 60 is provided with a locator member 70 on each side 62 disposed at the lower end 72 of the carrier 60. The member 70 is designed to engage the cutout section 54 located at the bottom of the magazine. The top of the carrier is provided with a plurality of the clamping mechanisms 74, one on each surface 62, which is designed to engage the slot 56 and cutout section 54. The clamping mechanisms 74 each include a clamping plate member 76 which can be tightened against the magazine 10 by screw 78 such that the magazine will be held tightly in position on the carrier. The mechanism 74 also includes a locating member 70 which engages the locating slot 56 on the back surface 58 of the magazine 10. In the particular embodiment illustrated, the carrier 60 is provided with four sides. However, the present invention is not so limited. The carrier 60 may be comprised of any number of sides for carrying any desired number of magazines. For example, as illustrated in FIG. 8, which is described in greater detail later herein, there is provided a carrier 80 for holding six magazines 10.

Figure 7:
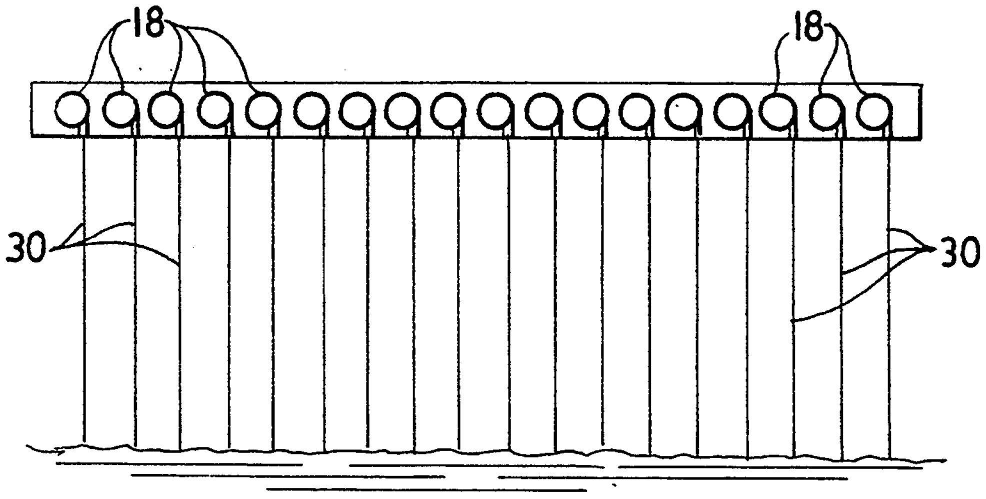
FIG. 7 is a side elevational view of the magazine of FIG. 1 in the horizontal position containing a plurality of film cartridges wherein the film within the cartridges have been thrust out of the cartridge.

Referring to FIG. 7, there is illustrated a single magazine 10 positioned in a horizontal orientation with the snouts facing downward wherein the filmstrips 30 in each of the thrust cartridges 18 have been thrust out of their respective thrust cartridges 18 so that the filmstrips 30 are in their fully extended position. In this position, the magazine may be clamped by an appropriate mechanism and passed through a photofinishing process wherein each of the filmstrips 30 are developed. For example, the filmstrips 30 in this position can be passed through a process commonly referred to as the dip and dunk processor wherein the filmstrips are passed first to a developer tank. The magazine would then pass the next station and be vertically moved into and out of a fix bath. Then in a similar manner, the filmstrips 30 are placed into a wash bath. Thereafter the filmstrips are allowed to dry and rewound into their respective thrust cartridges 18. Thus, the magazine 10 can be initially used for initially receiving cartridges 18 that are sent to the photofinisher for processing and held in the magazine throughout the entire development process of the film.

After the filmstrips 30 have been processed and developed, as previously discussed, they are rewound back into their respective cartridges 18. Thereafter the magazine 10 can be placed onto a carrier. Referring to FIG. 8, there is illustrated carrier 80 having six sides for holding six magazines 10 and having means for clamping the magazines on each of its sides 62. The carrier 80 is provided with a handle 82 for carrying and transporting of the carrier 80 to its respective workstation/processing equipment.

Figure 8:
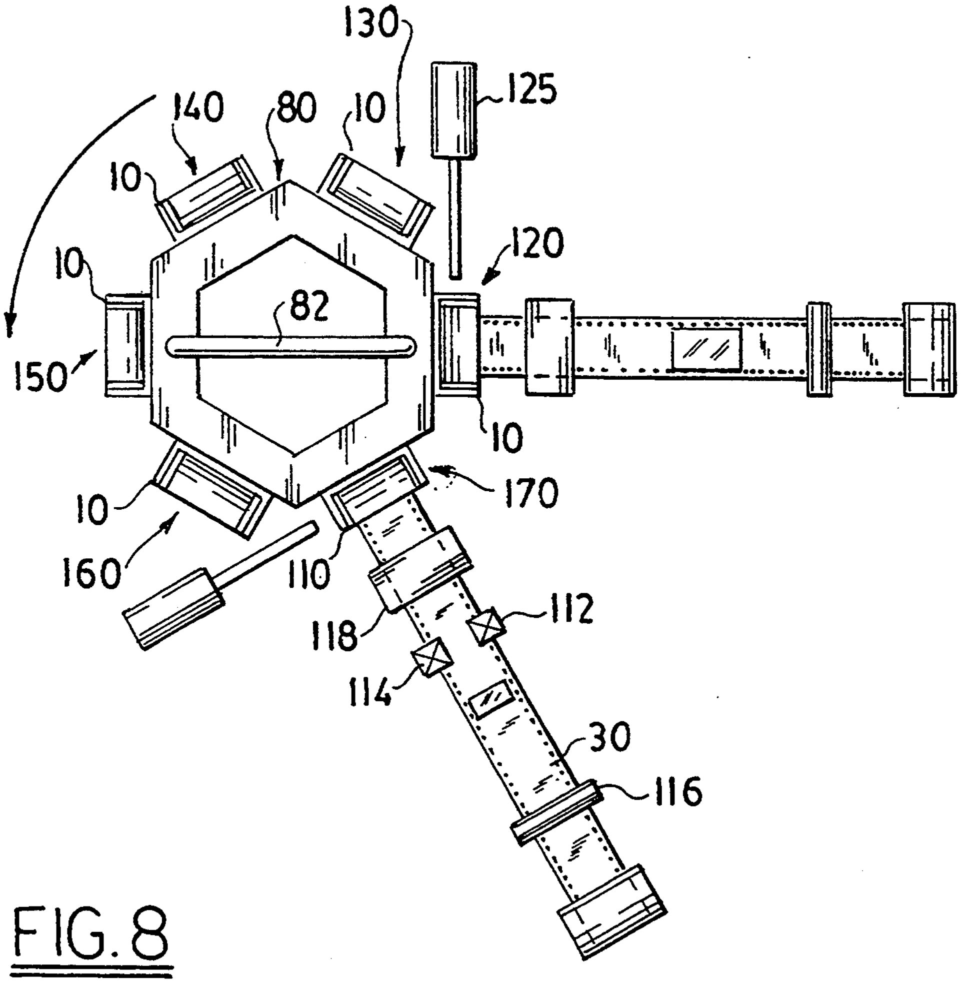
FIG. 8 is a top plan view of a modified carrier made in accordance with the present invention having a plurality of magazines made in accordance with the present invention mounted thereon, the carrier being positioned in a photofinishing equipment having a plurality of workstations.

FIG. 8 illustrates a top plan view of the carrier 80 at a workstation on a piece of photofinishing equipment, for example, a printer which would be used to print the image stored on the photographic filmstrips onto photographic paper. In particular, there is provided a first station 110 wherein filmstrips 30 disposed within the thrust cartridges 18 are sequentially thrust out of each cartridge 18. Appropriate read heads are used to read information on the filmstrip 30 that is thrust out. For example, at this read station 110 the filmstrip 30 in each of the thrust cartridges 18 is thrust out and appropriate read heads 112,114,116,118 are used to scan the images for image density and barcode data is placed on a edge of the film and/or magnetic information that may be placed on the filmstrip 30. After the appropriate information has been read, the filmstrip 30 is rewound into the cartridge 18. The information read is stored in the appropriate memory of a computer provided at the printer, or at some other area. After the filmstrip 30 has been read and rewound, the carrier 80 is rotated to the next station 120 wherein the filmstrip 30 is again thrust out of cartridge 18. Station 120 can be a print station for exposing images on the filmstrip onto photosensitive paper which is later developed. An appropriate mechanism 125 engages the spool 32 so as to thrust the filmstrip 30 out, allowing the images to be individually located at the print station for printing of the image on a photographic paper. After the film has been printed, the mechanism 125 will rotate the spool 32 in the opposite direction for rewinding the film back into the cartridge 18. At station 120, the information previously obtained at station 110 can be used to control the printer. For example, when the filmstrip 30 is at the print station 120 information that was initially obtained at scan station 110 can be accessed by the computer so as to adjust and provide the appropriate information for printing of the film and provide any additional information on the back of the print that may be desired. The cartridges 18 are moved to successive workstations 130,140,150,160 where additional operations may be provided if desired to the cartridges 18 if so desired. Thereafter the carrier 18 is rotated until all the thrust film cartridges have been provided at each of the stations.

Figure 9:
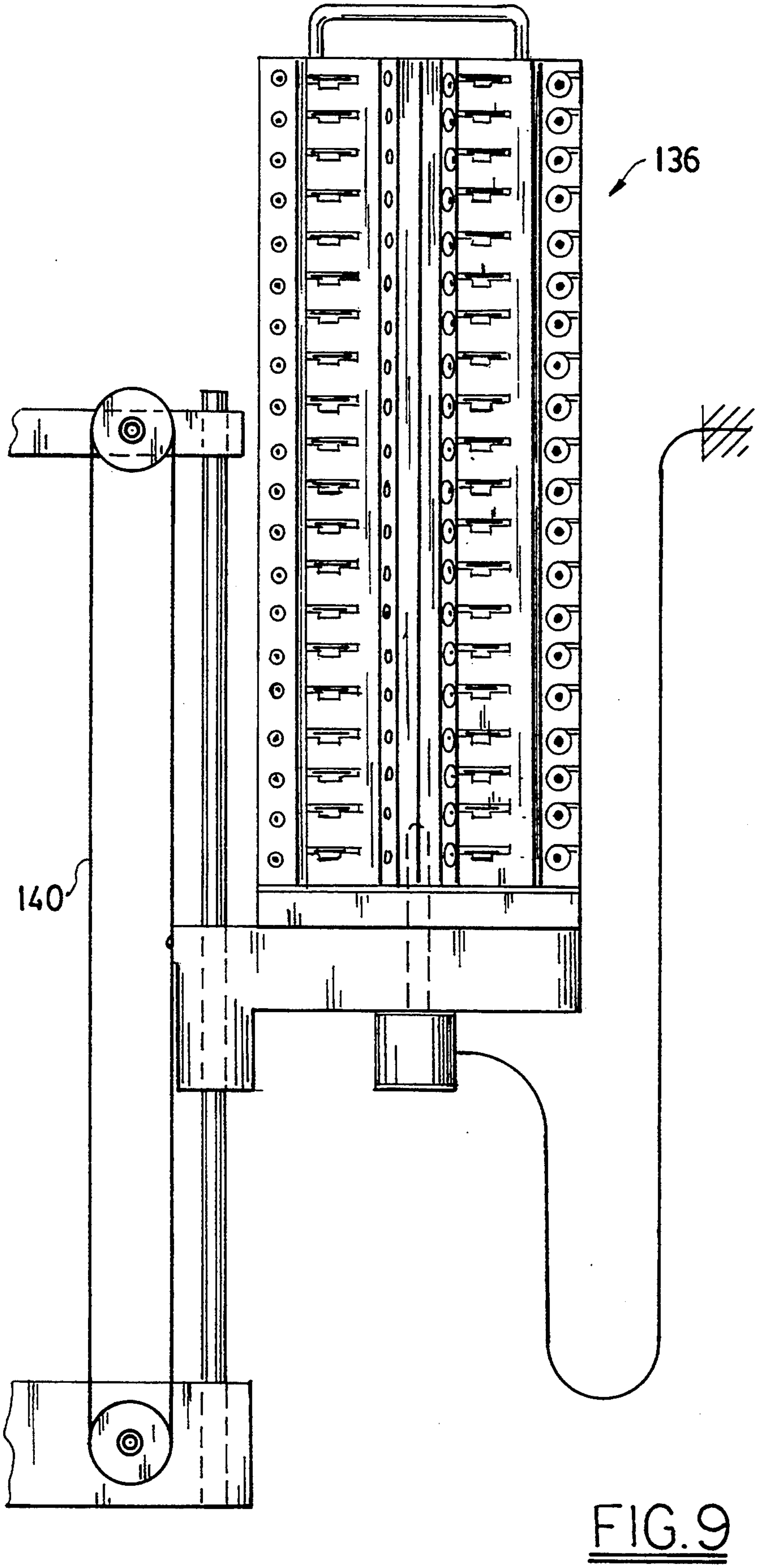
FIG. 9 is a side elevational view of the carrier of FIG. 8 mounted on a mechanism for moving the carrier in a vertical direction and rotating the carrier through various workstations.

An appropriate mechanism is provided for locating vertically each of the thrust film cartridges 18 at the workstations 110,120,130,140,150,160. For example, as illustrated in FIG. 9, there is provided an elevator mechanism 136 which includes a vertical pulley system 140 which indexes each of the thrust film cartridges 18 so that the next vertically positioned film cartridge 18 (which may be above or below) will be successively placed at the workstation. This process is repeated for each of the cartridges 18 until all of the cartridges in each magazine has been properly addressed. Thereafter the entire carrier is indexed so that each of the cartridges will be successively positioned at the next adjacent workstation. It is of course understood that the present invention is not limited to the particular configuration described. The elevator mechanism 136 may be operated such that all the cartridges 18 in a single magazine are first reviewed before vertically indexing the carrier 80 so that the next level of thrust film cartridges 18 are delivered at the appropriate workstation.

The magazine 10 can then be used to transport the cartridge 18 to the next appropriate station, for example, sorting of the film cartridges and the prints that were previously developed. In which case prints associated with each magazine can be associated and then later again resorted so that the prints associated with each cartridge will be brought back to each other for appropriate packaging and delivery to the customer.

The present invention provides a magazine for holding a plurality of thrust film cartridges which can be easily incorporated into the entire photofinishing process so as to provide efficient and easy manipulation of the film cartridge at the various processing stations.

It is to be understood that various modifications and changes may be made without departing from the scope of the present invention. The present invention being limited by the following claims.

Parts List

10 . . . magazine
12 . . . support member
14 . . . cover member
16 . . . retaining pockets
18 . . . film thrust cartridge
20 . . . cylindrical body
22 . . . snout
24,26 . . . side walls
28 . . . opening
30 . . . filmstrip
32 . . . spool
34 . . . supply opening
36 . . . retaining member
38 . . . end member
40 . . . retaining end member
41 . . . engaging surface
42 . . . access opening
43 . . . arrow
44 . . . opening
47 . . . surface
48 . . . support surface
49 . . . surface
50 . . . bottom surface
51 . . . bottom surface
52 . . . top surface
54 . . . cutout sections
56 . . . slot
58 . . . back surface
55 . . . cutout
58 . . . back surface
60 . . . carrier
62 . . . side
66 . . . cutout section
70 . . . locator member
72 . . . lower end
74 . . . clamping mechanism
76 . . . clamping plate member
78 . . . adjustment screw
80 . . . carrier
82 . . . handle
110,120,130,140,150,160 . . . work stations
112,114,116,118 . . . heads
125 . . . mechanism
136 . . . elevator mechanism
140 . . . vertical pulley system

I claim:

1. A magazine for holding plurality of film cartridges, comprising:

a plurality of retaining pockets provided in said magazine, said plurality of pockets are vertically aligned, each pocket designed to hold a film thrust cartridge, each thrust cartridge having a rotatably mounted spool therein for holding a filmstrip wound around said spool, said magazine having a flexible retaining member associated with each of said pockets for allowing insertion or removal of the thrust cartridge from the pocket and for retaining the thrust cartridge in a predetermined position when the thrust cartridge is disposed in said pocket, said magazine having a first access opening for allowing placement of said cartridge into said pocket and for allowing access to the spool of the thrust cartridge such that the spool can be rotated thrusting the filmstrip out of the cartridge or rewound back into the cartridge and a second access opening associated with each of said pockets for allowing the filmstrip to be removed from the thrust cartridge or returned to the thrust cartridge while the cartridge is in the pocket.

2. A magazine according to claim 1, wherein said magazine comprises a support member and a cover member.

3. A magazine according to claim 2, wherein said cartridge comprises a generally cylindrical section and a snout section, said support member forming the portion of said pocket that retains said cylindrical section and said cover section having said second opening for receiving said snout.

4. A magazine according to claim 3 wherein said cover includes a flexible retaining member associated with each pocket for holding and retaining said cartridge within said pocket.

5. A magazine according to claim 4 wherein said cover member is made of a plastic material.

6. A magazine according to claim 5 wherein said cover member is made of polycarbonate.

7. A magazine according to claim 4 wherein said support member is made of a plastic material.

8. A magazine according to claim 7 wherein said support member is made of polycarbonate.

9. A magazine according to claim 1 wherein a third opening is provided in said magazine for allowing access to the side of the cartridge opposite said first access opening.

10. A thrust film cartridge handling system comprising:

a carrier having mounting means for mounting, and at least one magazine for holding at least one film cartridge to said carrier;

said magazine comprising a plurality of retaining pockets provided in said magazine, said plurality of pockets are vertically aligned, each pocket designed to hold a film thrust cartridge, each thrust cartridge having a rotatably mounted spool therein for holding a filmstrip wound around said spool, said magazine having a flexible retaining member associated with each of said pockets for allowing insertion or removal of the thrust cartridge from the pocket and for retaining the thrust cartridge in a predetermined position when the thrust cartridge is disposed in said pocket, said magazine having a first access opening for allowing placement of said cartridge into said pocket and for allowing access to the spool of the thrust cartridge such that the spool can be rotated thrusting the filmstrip out of the cartridge or rewound back into the cartridge and a second access opening associated with each of said pockets for allowing the filmstrip to be removed from the thrust cartridge or returned to the thrust cartridge while the cartridge is in the pocket.

11. A thrust film cartridge handling system according to claim 10, wherein said magazine comprises a support member and a cover member.

12. A thrust film cartridge handling system according to claim 11, wherein said cartridge comprises a generally cylindrical section and a snout section, said support member forming the portion of said pocket that retains said cylindrical section and said cover section having said second opening for receiving said snout.

13. A thrust film cartridge handling system according to claim 12 wherein said cover includes a flexible retaining member associated with each pocket for holding and retaining said cartridge within said pocket.

14. A thrust film cartridge handling system according to claim 13 wherein said cover member is made of a plastic material.

15. A thrust film cartridge handling system according to claim 14 wherein said cover member is made of polycarbonate.

16. A thrust film cartridge handling system according to claim 13 wherein said support member is made of a plastic material.

17. A thrust film cartridge handling system according to claim 16 wherein said support member is made of polycarbonate.

18. A thrust film cartridge handling system according to claim 10 wherein a third opening is provided in said magazine for allowing access to the side of the cartridge opposite said first access opening.

19. A thrust film cartridge handling system according to claim 10 wherein said carrier is provided with a handle for moving said carrier and any of said magazines attached thereto.

20. A thrust film cartridge handling system according to claim 10 wherein said carrier can be placed directly in a work station of a photofinishing device.

21. A method of handling a thrust film cartridge comprising steps of:

providing a film magazine comprising a plurality of retaining pockets provided in said magazine, each pocket designed to hold a film thrust cartridge, each thrust cartridge having a rotatably mounted spool therein for holding a filmstrip wound around said spool, said magazine having a flexible retaining member associated with each of said pockets for allowing insertion or removal of the thrust cartridge from the pocket and for retaining the thrust cartridge in a predetermined position when the thrust cartridge is disposed in said pocket, said magazine having a first access opening for allowing placement of said cartridge into said pocket and for allowing access to the spool of the thrust cartridge such that the spool can be rotated thrusting the filmstrip out of the cartridge or rewound back into the cartridge, a second access opening associated with each of said pockets for allowing the filmstrip to be removed from the thrust cartridge or returned to the thrust cartridge while the cartridge is in the pocket, and a third access opening for allowing access to the side of the cartridge opposite said first access opening;

transporting the film cartridges disposed in said magazine through a plurality of workstations;

thrusting of the filmstrip from said cartridge to a workstation and returning the filmstrip to said thrust cartridge while said thrust cartridge is being held in said magazine;

transporting the cartridges while in said magazines to a subsequent workstation: and removing the cartridge from said magazine by placing a tool through said third access opening so as to push said cartridge out of said magazine.

22. A magazine for holding plurality of film cartridges, comprising:

a plurality of retaining pockets provided in said magazine, each pocket designed to hold a film thrust cartridge, each thrust cartridge having a rotatably mounted spool therein for holding a filmstrip wound around said spool, said magazine having a flexible retaining member associated with each of said pockets for allowing insertion or removal of the thrust cartridge from the pocket and for retaining the thrust cartridge in a predetermined position when the thrust cartridge is disposed in said pocket, said magazine having a first access opening for allowing placement of said cartridge into said pocket and for allowing access to the spool of the thrust cartridge such that the spool can be rotated thrusting the filmstrip out of the cartridge or rewound back into the cartridge, a second access opening associated with each of said pockets for allowing the filmstrip to be removed from the thrust cartridge or returned to the thrust cartridge while the cartridge is in the pocket, a third access opening for allowing access to the side of the cartridge opposite said first access opening.

23. A magazine for holding plurality of film cartridges, comprising:

a cover; and a support member having a plurality of retaining pockets provided in said magazine, each pocket designed to hold a film thrust cartridge, each thrust cartridge having a rotatably mounted spool therein for holding a filmstrip wound around said spool, said magazine having a flexible retaining member associated with each of said pockets for allowing insertion or removal of the thrust cartridge from the pocket and for retaining the thrust cartridge in a predetermined position when the thrust cartridge is disposed in said pocket, said magazine having a first access opening for allowing placement of said cartridge into said pocket and for allowing access to the spool of the thrust cartridge such that the spool can be rotated thrusting the filmstrip out of the cartridge or rewound back into the cartridge and a second access opening associated with each of said pockets for allowing the filmstrip to be removed from the thrust cartridge or returned to the thrust cartridge while the cartridge is in the pocket.

24. A thrust film cartridge handling system comprising:

a carrier having mounting means for mounting, and at least one magazine for holding at least one film cartridge to said carrier;

said magazine comprising a support member and a cover member, said support member having a plurality of retaining pockets provided in said magazine, said plurality of pockets are vertically aligned, each pocket designed to hold a film thrust cartridge, each thrust cartridge having a rotatably mounted spool therein for holding a filmstrip wound around said spool, said magazine having a flexible retaining member associated with each of said pockets for allowing insertion or removal of the thrust cartridge from the pocket and for retaining the thrust cartridge in a predetermined position when the thrust cartridge is disposed in said pocket, said magazine having a first access opening for allowing placement of said cartridge into said pocket and for allowing access to the spool of the thrust cartridge such that the spool can be rotated thrusting the filmstrip out of the cartridge or rewound back into the cartridge and a second access opening associated with each of said pockets for allowing the filmstrip to be removed from the thrust cartridge or returned to the thrust cartridge while the cartridge is in the pocket.

25. A thrust film cartridge handling system comprising:

a carrier having mounting means for mounting, and at least one magazine for holding at least one film cartridge to said carrier;

said magazine comprising a plurality of retaining pockets provided in said magazine, said plurality of pockets are vertically aligned, each pocket designed to hold a film thrust cartridge, each thrust cartridge having a rotatably mounted spool therein for holding a filmstrip wound around said spool, said magazine having a flexible retaining member associated with each of said pockets for allowing insertion or removal of the thrust cartridge from the pocket and for retaining the thrust cartridge in a predetermined position when the thrust cartridge is disposed in said pocket, said magazine having a first access opening for allowing placement of said cartridge into said pocket and for allowing access to the spool of the thrust cartridge such that the spool can be rotated thrusting the filmstrip out of the cartridge or rewound back into the cartridge, a second access opening associated with each of said pockets for allowing the filmstrip to be removed from the thrust cartridge or returned to the thrust cartridge while the cartridge is in the pocket, and a third opening in said magazine for allowing access to the side of the cartridge opposite said first access opening.

26. A thrust film cartridge handling system comprising:

a carrier having mounting means for mounting, and at least one magazine for holding at least one film cartridge to said carrier, said carrier is provided with a handle for moving said carrier and any of said magazines attached thereto;

said magazine comprising a plurality of retaining pockets provided in said magazine, said plurality of pockets are vertically aligned, each pocket designed to hold a film thrust cartridge, each thrust cartridge having a rotatably mounted spool therein for holding a filmstrip wound around said spool, said magazine having a flexible retaining member associated with each of said pockets for allowing insertion or removal of the thrust cartridge from the pocket and for retaining the thrust cartridge in a predetermined position when the thrust cartridge is disposed in said pocket, said magazine having a first access opening for allowing placement of said cartridge into said pocket and for allowing access to the spool of the thrust cartridge such that the spool can be rotated thrusting the filmstrip out of the cartridge or rewound back into the cartridge and a second access opening associated with each of said pockets for allowing the filmstrip to be removed from the thrust cartridge or returned to the thrust cartridge while the cartridge is in the pocket.

27. A thrust film cartridge handling system comprising:

a carrier having mounting means for mounting, and at least one magazine for holding at least one film cartridge to said carrier, said carrier can be placed directly in a work station of a photofinishing device;

said magazine comprising a plurality of retaining pockets provided in said magazine, said plurality of pockets are vertically aligned, each pocket designed to hold a film thrust cartridge, each thrust cartridge having a rotatably mounted spool therein for holding a filmstrip wound around said spool, said magazine having a flexible retaining member associated with each of said pockets for allowing insertion or removal of the thrust cartridge from the pocket and for retaining the thrust cartridge in a predetermined position when the thrust cartridge is disposed in said pocket, said magazine having a first access opening for allowing placement of said cartridge into said pocket and for allowing access to the spool of the thrust cartridge such that the spool can be rotated thrusting the filmstrip out of the cartridge or rewound back into the cartridge and a second access opening associated with each of said pockets for allowing the filmstrip to be removed from the thrust cartridge or returned to the thrust cartridge while the cartridge is in the pocket.

* * * * *